(12) United States Patent
Pamulaparthy

(10) Patent No.: US 8,931,453 B1
(45) Date of Patent: Jan. 13, 2015

(54) CRANKCASE TOP DECK FOR AN INTERNAL COMBUSTION ENGINE

(71) Applicant: Electro-Motive Diesel, Inc., LaGrange, IL (US)

(72) Inventor: Abhinav R. Pamulaparthy, Aurora, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/088,109

(22) Filed: Nov. 22, 2013

(51) Int. Cl.
*F02F 1/10* (2006.01)
*F02F 7/00* (2006.01)

(52) U.S. Cl.
CPC ..................... *F02F 7/0021* (2013.01)
USPC ..................... 123/195 R; 123/54.4

(58) Field of Classification Search
USPC ........... 123/54.4–54.8, 195 R, 195 S, 195 AC
See application file for complete search history.

(56) References Cited

U.S. PATENT DOCUMENTS

| | | |
|---|---|---|
| 4,284,037 A | 8/1981 | Kasting et al. |
| 4,832,383 A | 5/1989 | Roussel |
| 4,924,967 A | 5/1990 | Ike et al. |
| 6,068,302 A | 5/2000 | Sasse et al. |
| 6,552,294 B1 | 4/2003 | Ananthanarayanan et al. |
| 6,827,049 B2 | 12/2004 | Oh |
| 7,647,901 B2 | 1/2010 | Funahashi |
| 7,784,442 B2 | 8/2010 | Lester et al. |
| 8,002,167 B2 | 8/2011 | Zuber et al. |
| 2010/0242869 A1 | 9/2010 | Knollmayr |
| 2011/0277708 A1 | 11/2011 | Geiser et al. |
| 2013/0000287 A1 | 1/2013 | Grivetti et al. |

*Primary Examiner* — Noah Kamen

(57) ABSTRACT

A top deck area of a crankcase is provided. The top deck area includes an exhaust elbow extending from a side surface towards a top surface of the top deck area. The top deck area also includes a plate. The plate is configured to define a first chamber and a second chamber within the top deck area. The first chamber is configured to at least partially enclose the exhaust elbow. The second chamber is configured to provide a passage for a fluid flow such that the plate is disposed to isolate the second chamber from the exhaust elbow.

18 Claims, 4 Drawing Sheets

US 8,931,453 B1

CRANKCASE TOP DECK FOR AN INTERNAL COMBUSTION ENGINE

TECHNICAL FIELD

The present disclosure relates to a crankcase of an engine, and more specifically to the top deck of the crankcase of an internal combustion engine.

BACKGROUND

During operation of an engine, a high temperature exhaust gas is generated. The high temperature exhaust gas flows from a cylinder to an exhaust manifold via an exhaust elbow. The exhaust elbow is disposed in a top deck area. The top deck area also acts as a reservoir for a coolant of the engine.

The temperature of the exhaust gas is substantially greater than that of the coolant in the reservoir. This may result in a large thermal gradient between the exhaust gas within the exhaust elbow and the coolant within the top deck area. Hence, welds used to attach the exhaust elbow to the top deck area may tend to fail or crack. The coolant from the reservoir may leak from the cracks developed in the welds. This may cause deficiency of the coolant from the engine, leading to a failure of a cooling system of the engine due to overheating.

U.S. Pat. No. 6,827,049 discloses a water jacket for a cylinder head. The water jacket includes at least two exhaust ports configured to exhaust combusted gases from a cylinder. The water jacket also defines a lower path, a higher path, and a central path. The higher path is configured for circulating cooling fluid above the at least two exhaust ports. The lower path is configured for circulating cooling fluid below the at least two exhaust ports. Also, the central path fluidly couples the lower path to the higher path. The central path also separates the at least two exhaust ports from one another. The central path is also configured for circulating cooling fluid between said at least two exhaust ports. A restricted portion is formed in the lower path on one side of said central path. The restricted portion is configured to restrict flow through the restricted portion of the lower path, thereby forcing cooling fluid through the central path.

SUMMARY OF THE DISCLOSURE

In one aspect of the present disclosure, a top deck area of a crankcase is provided. The top deck area includes an exhaust elbow extending from a side surface towards a top surface of the top deck area. The top deck area also includes a plate. The plate is configured to define a first chamber and a second chamber within the top deck area. The first chamber is configured to at least partially enclose the exhaust elbow. The second chamber is configured to provide a passage for a fluid flow such that the plate is disposed to isolate the second chamber from the exhaust elbow.

In another aspect, an engine is provided. The engine includes a cylinder head and an engine block. The engine block includes a top deck area. The top deck area includes an exhaust elbow extending from a side surface towards a top surface of the top deck area. The top deck area also includes a plate configured to define a first chamber and a second chamber within the top deck area. The first chamber is configured to at least partially enclose the exhaust elbow. The second chamber is configured to provide a passage for a fluid flow such that the plate is disposed to isolate the second chamber from the exhaust elbow.

DETAILED DESCRIPTION

Figure 1:
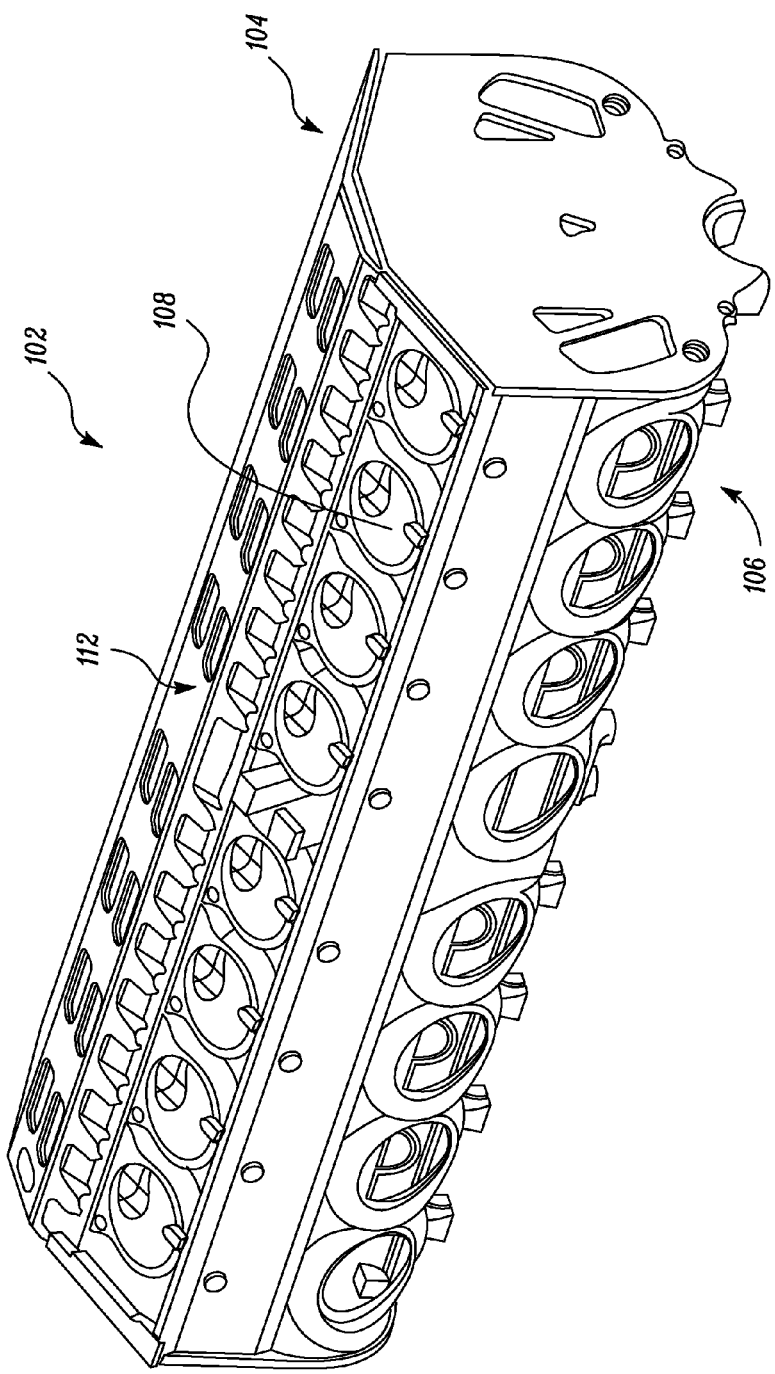
FIG. 1 is a perspective view of an exemplary crankcase of an engine, according to one embodiment of the present disclosure.

Wherever possible, the same reference numbers will be used throughout the drawings to refer to the same or the like parts. Referring to FIG. 1, an exemplary crankcase 102 of an engine (not shown) is illustrated, according to one embodiment of present disclosure. More specifically, the crankcase 102 illustrated is of a V-configuration engine. It should be noted that the configuration of the crankcase 102 disclosed herein is merely exemplary and may vary as per system design and requirements. For example, the configuration of the crankcase 102 may include an inline configuration engine, a horizontally opposed configuration engine or a W-configuration engine. In one embodiment, the crankcase 102 may be fabricated from one or more components. In such a situation, various components of the crankcase 102 may be fastened together by any know fastening methods such as, but not limited to, welding, and bolting. In another embodiment, the crankcase 102 may be cast as a single component. The crankcase 102 may be made of any suitable metal known to one skilled in the art.

The crankcase 102 includes a cylinder end 104 and a crankshaft end 106. A cylinder head (not shown) may be provided on the cylinder end 104 of the crankcase 102. The cylinder end 104 includes one or more cylinders 108. An assembly of the cylinder head and a liner (not shown) is configured to support a piston (not shown). The piston may be connected to a connecting rod (not shown) by using gudgeon pins (not shown). Further, the connecting rod may be connected to a crankshaft (not shown). The crankshaft end 106 of the crankcase 102 is configured to receive and support the crankshaft of the engine.

A cooling system (not shown) may be associated with the engine. The cooling system may include various components including, but not limited to, a coolant pump (not shown), a coolant inlet manifold (not shown), a coolant inlet jumper (not shown), and a coolant jacket (not shown). A coolant (not shown) may be supplied by the coolant pump to the coolant inlet manifold. The coolant may enter the coolant inlet jumper from the coolant inlet manifold. The coolant may be supplied to the coolant jacket and further into the crankcase 102. Heat generated during operation of the engine may be absorbed by the coolant. The coolant may then enter the cylinder head and may further absorb the heat from various components such as exhaust valves (not shown). The coolant may be any known heat absorbing fluid known in the art including, but not limited to, water, methanol, glycerol and oil based solutions.

Figure 2:
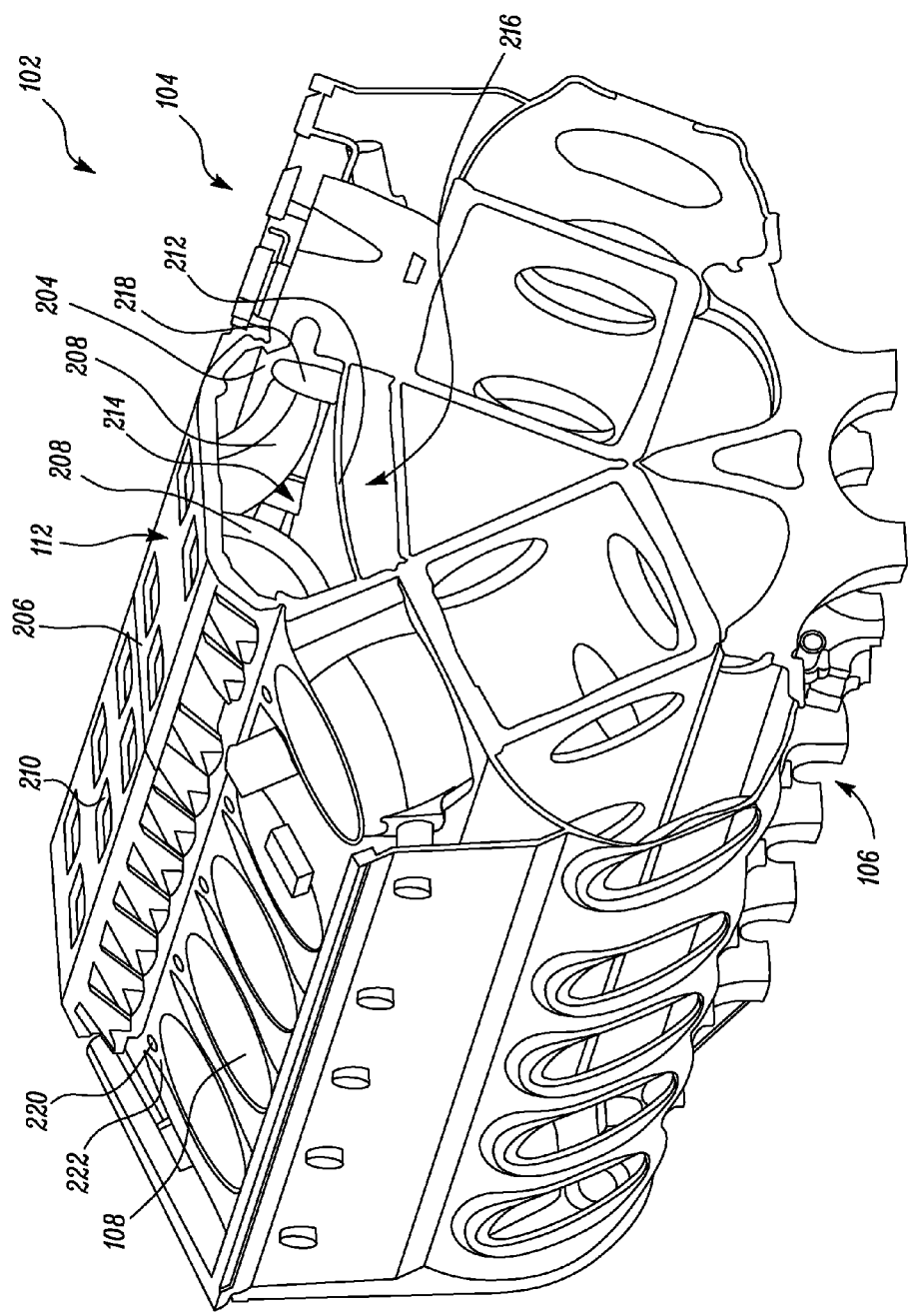
FIG. 2 is a cross sectional view of one end of the crankcase including a plate.

Further, the crankcase 102 includes a top deck area 112. Referring to FIG. 2, a cut away perspective view of one end of the crankcase 102 is illustrated. The top deck area 112 includes a side surface 204 and a top surface 206. The top deck area 112 may include a plurality of exhaust elbows 208 extending from the side surface 204 towards the top surface 206 of the top deck area 112. More specifically, the exhaust elbow 208 is configured to fluidly connect the cylinder 108 at the side surface 204 to the top surface 206 of the top deck area 112. The top surface 206 of the top deck area 112 may be provided with an exhaust manifold (not shown). In such a configuration, the exhaust elbow 208 may be fluidly coupled to the exhaust manifold. The top deck area 112 is configured to receive a supply of the coolant from a coolant inlet port 220. The top surface 206 of the top deck area 112 may have a plurality of slots 210.

One end of the exhaust elbow 208 may be welded to the side surface 204 of the top deck area 112 and/or the cylinder 108. Another end of the exhaust elbow 208 may be welded to the slot 210 provided in the top surface 206 of the top deck area 112. In one embodiment of the present disclosure, the exhaust elbow 208 may be fabricated from two or more C-shaped components (not shown). The C-shaped components may be welded together to form the exhaust elbow 208. In another embodiment, the exhaust elbow 208 may be molded or cast as a single component. The exhaust elbow 208 may include a flange (not shown) provided at one or both ends of the exhaust elbow 208. In one embodiment, a thickness of the flange may be substantially greater than a thickness of a wall of the exhaust elbow 208. The greater thickness may provide adequate space for a thicker weld run between the slot 210 and the flange. The thicker weld run may provide an increase in weld strength.

The present disclosure relates to a plate 212 provided in the top deck area 112 of the crankcase 102. As shown in FIG. 2, the plate 212 is configured to define a first chamber 214 and a second chamber 216 within the top deck area 112. The first chamber 214 of the top deck area 112 is configured to at least partially enclose the plurality of exhaust elbows 208. The plate 212 is disposed below the plurality of exhaust elbows 208. The first chamber 214 may also include a plurality of siphon tubes 218. The siphon tube 218 may be made of any metal known in the art. The siphon tube 218 is configured to provide a passage for a flow of the coolant. In one embodiment, the coolant inlet port 220 may be drilled in a cylinder wall 222 to connect the coolant jacket to the siphon tube 218. In another embodiment, the coolant inlet port 220 may be cast integrally into the crankcase 102. The siphon tube 218 may fluidly connect the coolant jacket to the second chamber 216 of the top deck area 112. The siphon tube 218 also allows reversal of the flow of the coolant from the second chamber 216 to the coolant jacket and further towards the coolant pump.

The second chamber 216 of the top deck area 112 defined by the plate 212 may act as a reservoir for the coolant of the cooling system of the engine. The coolant may enter the reservoir by the plurality of siphon tubes 218 provided in fluid communication with the second chamber 216. A temperature of an exhaust gas in the exhaust elbow 208 is substantially greater than a temperature of the coolant.

The plate 212 in the present disclosure is disposed to separate the second chamber 216 from the exhaust elbow 208. In one embodiment, the plate 212 may be fixedly attached in the top deck area 112 by any known fastening methods including, but not limited to, welding and bolting. In another embodiment, the plate 212 may be integrally cast into a single component.

Figure 3:
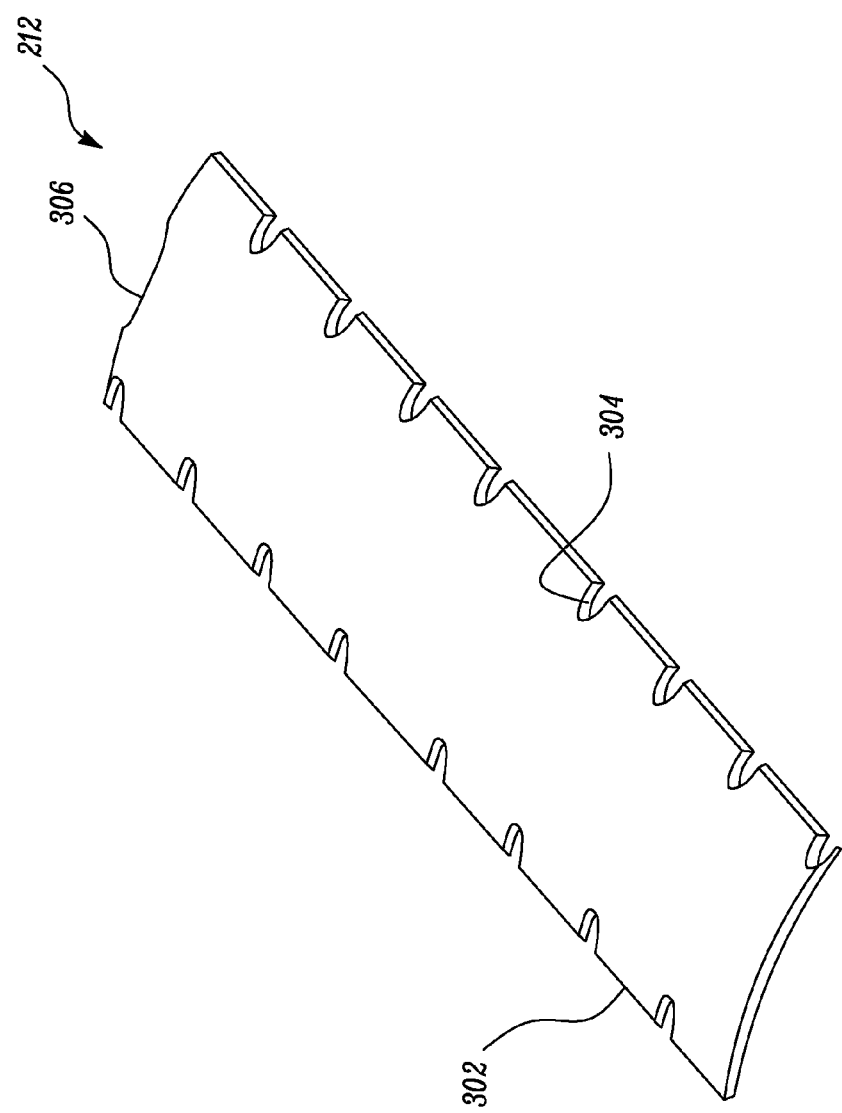
FIG. 3 is a perspective view of the plate.

Referring to FIG. 3, a perspective view of the plate 212 is illustrated. As illustrated in the given embodiment, the plate 212 has a curved configuration. In another embodiment, the plate 212 may have any other configuration such as a flat configuration. The plate 212 may extend at least partway along a length of the top deck area 112. The plate 212 may be made of any thickness as per design and requirement of system. The plate 212 may be manufactured from any metal known in the art.

Figure 4:
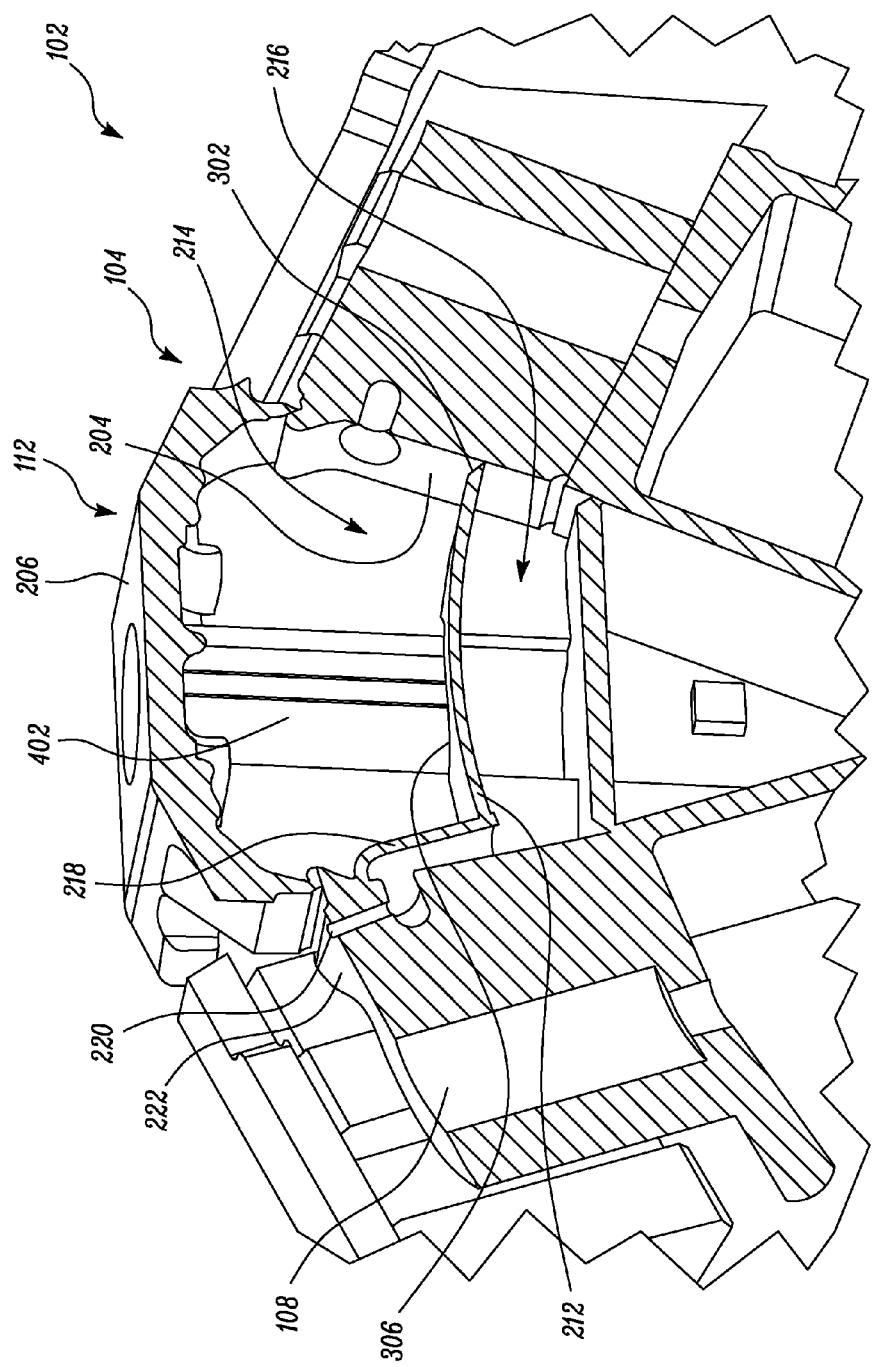
FIG. 4 is a cross sectional view of another end of the crankcase.

Additionally, edges 302 of the plate 212 may be chamfered. The chamfered edges 302 may facilitate a full penetration of the welding. The plate 212 may include a number of recesses 304 corresponding to locations of the plurality of siphon tubes 218. The plate 212 may further include an outlet 306 positioned at one end of the plate 212. The outlet 306 may be configured to provide a passage for the coolant present within the second chamber 216 to exit the top deck area 112. As illustrated in FIG. 4, a conduit 402 or a tube 402 may be provided at the outlet 306. The conduit 402 may provide a passage for a flow of the coolant. The conduit 402 may be affixed to the plate 212 by any known fastening methods such as welding, bolting, and so on. Further, the outlet 306 of the second chamber 216 may be in fluid communication with a radiator (not shown) or any other component of the engine.

INDUSTRIAL APPLICABILITY

The exhaust gas generated during the operation of the engine flows from the cylinders to the exhaust manifold through the plurality of exhaust elbows. The temperature of the exhaust gas generated is very high. In the current design, the exhaust elbow is disposed in the top deck area of the engine. The top deck area also serves as the reservoir for the coolant in the engine, such that the exhaust elbow is at least partially submerged in the coolant. The temperature of the exhaust gas and in turn the temperature of the exhaust elbow is substantially greater than the temperature of the coolant. This results in a large thermal gradient between the exhaust elbow and the coolant. The large thermal gradient results in a failure of the weld provided between the exhaust elbow and the top surface of the top deck area. As a result, the coolant may leak through cracks developed in the welds due to the failure. This may cause a reduction in a volume of the coolant leading to the failure of the cooling system and also the engine due to overheating.

One solution for preventing the failure of the weld is to increase the thickness of the flange of the exhaust elbow. The increase in the thickness of the flange may provide adequate space for a greater size of the weld. The greater size of the weld may provide increased strength to the weld, and may thus prevent the failure of the weld.

Another solution for preventing the failure of the weld includes re-welding of an area which may have undergone the failure. The area may be cleaned and multiple weld runs may be applied. The multiple weld runs may increase the effective weld size, and thus increase a service life of the weld. In such a situation, the weld may be strengthened locally in locations at which the weld failure may have occurred. This may prevent the weld failure from transferring to other locations.

The plate 212 provided in the top deck area 112 disclosed herein defines the first chamber 214 and the second chamber 216 within the top deck area 112. The plurality of exhaust elbows 208 is provided in the first chamber 214 and is separated from the coolant present in the second chamber 216. As a result, there may be no thermal gradient in the plurality of the exhaust elbows 208. The reduced thermal gradient may allow for the prevention in the failure of the weld present between the exhaust elbow 208 and the top deck area 112.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A top deck area of a crankcase, the top deck area comprising:
   an exhaust elbow extending from a side surface towards a top surface of the top deck area; and
   a plate configured to define a first chamber and a second chamber within the top deck area,
   wherein the first chamber is configured to at least partially enclose the exhaust elbow, and
   wherein the second chamber is configured to provide a passage for a fluid flow therein, such that the plate is disposed to isolate the second chamber from the exhaust elbow.

2. The top deck area of the crankcase of claim 1 further comprising:
   a siphon tube in fluid communication with the second chamber.

3. The top deck area of the crankcase of claim 2, wherein the plate includes a recess corresponding to a connection with the siphon tube.

4. The top deck area of the crankcase of claim 1, wherein the plate extends at least partway along a length of the top deck area.

5. The top deck area of the crankcase of claim 1, wherein the plate further includes an outlet positioned at one end of the plate.

6. The top deck area of the crankcase of claim 1, wherein one end of the exhaust elbow includes a flange, the flange having a thickness generally greater than a thickness of a wall of the exhaust elbow.

7. The top deck area of the crankcase of claim 1, wherein the plate is disposed below the exhaust elbow.

8. The top deck area of the crankcase of claim 1, wherein the plate is attached to the top deck area by welding.

9. The top deck area of the crankcase of claim 1, wherein the plate is made of metal.

10. An engine comprising:
    a cylinder head; and
    an engine block having a top deck area, the top deck area comprising:
      an exhaust elbow extending from a side surface towards a top surface of the top deck area; and
      a plate configured to define a first chamber and a second chamber within the top deck area,
      wherein the first chamber is configured to at least partially enclose the exhaust elbow, and
      wherein the second chamber is configured to provide a passage for a fluid flow therein, such that the plate is disposed to isolate the second chamber from the exhaust elbow.

11. The engine of claim 10 further comprising:
    a siphon tube in fluid communication with the second chamber.

12. The engine of claim 11, wherein the plate includes a recess corresponding to a connection with the siphon tube.

13. The engine of claim 10, wherein the plate extends at least partway along a length of the top deck area.

14. The engine of claim 10, wherein the plate further includes an outlet positioned at one end of the plate.

15. The engine of claim 10, wherein one end of the exhaust elbow includes a flange, the flange having a thickness generally greater than a thickness of a wall of the exhaust elbow.

16. The engine of claim 10, wherein the plate is disposed below the exhaust elbow.

17. The engine of claim 10, wherein the plate is attached to the top deck area by welding.

18. The engine of claim 10, wherein the plate is made of metal.

* * * * *